United States Patent Office 3,458,435
Patented July 29, 1969

3,458,435
METHOD FOR DISPOSAL OF WASTES CONTAINING NITROPHENOLS AND NITROANILINES
Robert H. L. Howe, West Lafayette, Ind., assignor to Eli Lilly and Company, Indianapolis, Ind., a corporation of Indiana
No Drawing. Filed Feb. 26, 1968, Ser. No. 707,982
Int. Cl. C02c 5/02, 5/00
U.S. Cl. 210—15          10 Claims

ABSTRACT OF THE DISCLOSURE

Colored nitrophenols and nitroanilines cannot be disposed of using conventional disposal techniques. However, disposal of such materials can be accomplished in conventional disposal systems after a pretreatment comprising acidification, adsorption of colored components, neutralization, and separation into an effluent and a sludge.

BACKGROUND OF THE INVENTION

A number of highly colored nitrophenols and nitroanilines are becoming increasingly important commercial products. Of special interest are those products which are commercially available as herbicides. In the manufacture of these nitrophenols and nitroanilines waste streams containing significant quantities of these materials are generated. Because of their toxicity to plant and aquatic life, it is essential that these nitrophenol and nitroaniline compounds be degraded before the waste streams are released to nature. The intense color of these compounds emphasizes the desirability of their degradation and also acts as a built-in indicator for their presence.

These nitrophenol and nitroaniline compounds are not satisfactorily degraded by conventional disposal systems. Thus, if waste streams containing such compounds are treated in the conventional manner, the effluent from such treatment contains unacceptably high concentrations of the nitro compound.

SUMMARY

I have now discovered that a waste stream containing color producing nitrophenols or nitroanilines can be disposed of in conventional disposal systems if such stream is first subjected to a pretreatment comprising acidifying to a pH of less than about three, adding an adsorbent material to take up colored components, adding a metallic oxide or hydroxide to adjust the pH to more than about five and also to form a precipitate, and separating the mixture into an effluent and a sludge or foam (scum). The effluent and sludge (or foam) can then be separately treated by conventional disposal means without interference from the original nitrophenol and nitroaniline compounds. Such a process results in treated wastes free of harmful amounts of nitrophenols and nitroanilines.

DESCRIPTION OF THE PREFERRED EMBODIMENT

My pretreatment may be beneficially employed in the disposal of streams containing nitrophenols and nitroanilines. A number of such compounds are commercially manufactured for use as herbicides. Such compounds are described, for example, in U.S. Patents Nos. 3,227,734, 3,257,190, and 3,321,292. The compounds described in these patents are N,N-disubstituted-2,6-dinitroanilines. Specific examples of such compounds include 2,6-dinitro-4-trifluoromethyl-N,N-dipropylaniline, 2,6 - dinitro-4-methylsulfonyl - N,N - dipropylaniline and 2,6 - dinitro-N,N-dipropyl-p-toluidine. My pretreatment may also be advantageously applied in the treatment and disposal of other nitroanilines not substituted on the amino nitrogen such as, for example, 2,4-dinitroaniline. Certain nitrophenols such as, for example, 2,6-dinitro-4-butylphenol are also employed as herbicides. Waste streams containing such nitrophenols may be subjected to my pretreatment prior to conventional disposal. My pretreatment may also be employed in the disposal of other nitrophenols such as, for example, 2,6-dinitrophenol, 2,4-dinitrophenol, and 2-nitro-4-amylphenol.

One of the advantages of my discovery is the fact that it involves a pretreatment of the waste stream and then utilizes a conventional disposal system to complete the treatment of the waste. This pretreatment can be added to an existing waste disposal system.

The first step of my pretreatment comprises the acidification of the waste stream to a pH of less than about three and preferably to a pH of about one. The preferred acids for this acidification are sulfuric acid, hydrochloric acid, and phosphoric acid, although other strong acids can be employed. In this highly acid medium, hydrolysis of any susceptible groups occurs.

In the second stage of my pretreatment, an adsorbent is added to adsorb color components. The preferred adsorbent is a stable, activated aerobic or anaerobic sludge, or a digested sludge. Any of the other well known adsorbent materials can also be used. Such materials include activated carbon, charcoal, sawdust, wheat flour, corn flour, clay, and activated alumina. The organic adsorbents are preferred. Optionally, a second or subsequent adsorbent treatment may be employed to obtain greater color reduction.

Neutralization of the mixture is preferably accomplished by the addition of lime. Neutralization may also advantageously be accomplished by the use of magnesium oxide or magnesium hydroxide. The neutralizing agent chosen should be one that forms a precipitate in water. Thus, the preference for such low-cost alkaline materials as calcium oxide, calcium hydroxide, magnesium oxide, and magnesium hydroxide is obvious. Other alkaline earth metal oxides and hydroxides may also be used but would be economically undesirable because of their high cost. The mixture should be neutralized to a pH of more than about five and preferably about seven. If the waste stream contains fluoride ions, the addition of some silicate at this time is desirable. Sufficient silicate to convert the fluoride to insoluble salts such as a silicofluoride should be added.

This mixture is then separated into an effluent and a sludge and/or a foam (scum). This separation may be effected by any convenient means such as, for example, sedimentation or floatation.

Following the separation both the effluent and the sludge (or foam) may be treated in conventional disposal systems. For example, the effluent may be subjected to biological treatment including at least one of aerobic oxidation, anaerobic reduction, or anaerobic hydrolysis. Alternatively, the effluent may be treated by some other procedure such as a biological filtration. The sludge may be treated by a procedure such as long term lagooning, centrifugation, or filtration with or without additional coagulation and thickening. The preferred treatment for the effluent is the biological treatment while that for the sludge is long term lagooning to further decompose the organic matter remaining therein. If coagulation is employed, any of the well known coagulating agents may be used. Many inorganic and organic coagulating agents are described in the prior art, such as, for example, iron and aluminum salts.

My process will be further illustrated by the following examples.

Example 1

A process waste stream from the production of 2,6-dinitro-4-trifluoromethyl-N,N-dipropylaniline was treated with sulfuric acid to a pH of approximately one. The acidified waste was mixed with digested sludge and some diatomaceous earth containing silicate at ten percent by volume of the waste and pumped to an aeration-reaction tank from which the sludge-waste mixture overflowed continuously to a secondary reactor and then returned to a secondary pH adjustment tank. Here the pH was adjusted to a value of about eight by the addition of lime. The mixture then entered a separation tank where the heavy solids fraction was allowed to settle and the light solids fraction was allowed to rise to the top of the separation tank. Both the heavy and light solids fractions were collected in a sump. At this point the pretreatment was completed and the sludge and effluent were subjected to conventional disposal treatments. The sludge was pumped to a two stage sludge lagoon system where it was allowed to undergo natural decomposition. The clear liquid effluent went to an oxidation tank from which it overflowed to a clarifier. The clarified effluent was chlorinated as needed and pumped to a bio-filter. The recycle ratio of the filter system was fourteen to one. After bio-filtration the effluent was pumped first to an aeration tank and then to a complete-mixing activated sludge system. At first the microbial population in the activated sludge process seemed to be rendered static. However, it gradually acclimated itself and the process proceeded without difficulty to final degradation. The characteristics of the waste stream and the clarified effluent are shown in the following table:

|  | Waste | Effluent |
| --- | --- | --- |
| pH | 9.0–9.5 | 7.5–7.9 |
| Color (Pt–Co) | Brown red 25,000–43,000 p.p.m. | 600–900 p.p.m. |
| Trifluralin | Varied from 20–43,000 p.p.m. | 0 to trace. |
| Total phenol | 2600–2800 p.p.m. | 0 to trace. |
| Fluoride | 310–470 p.p.m. | 0. |
| Total dissolved solids | 165,000–189,000 p.p.m. | 1,001–1,500 p.p.m. |
| Total colloidal and settleable solids. |  | 480–750 p.p.m. |
| C.O.D. |  | 600–920 p.p.m. |
| Five day B.O.D |  | 450–700 p.p.m. |
| Toxicity to test fish |  | None. |

Example 2

A synthetic waste stream was prepared by dissolving one gram of 2,6-dinitro-4-methylsulfonyl-N,N-dipropylaniline in 20 mls. of ethyl acetate followed by the addition of 80 mls. of distilled water. To this synthetic stream was added 1 ml. of concentrated sulfuric acid drop by drop with constant stirring. When there was no further evidence of chemical reaction, 20 mls. of digested sludge with 7½% suspended solids concentration was added with thorough mixing. Approximately 1 g. of calcium hydroxide was then added with rapid mixing. The sample was allowed to stand and the clarified liquid was separated and filtered. The original solution had a color of 38,000 p.p.m. while the treated effluent had a color of only 880 p.p.m. The oxygen demand equivalent of the original solution was 288,000 p.p.m. while that of the treated effluent was 7,500 p.p.m.

Example 3

A solution of 2,6-dinitro-N,N-dipropyl-p-toluidine was prepared and treated as in Example 2. Color was reduced from 35,000 to 600 p.p.m. while the oxygen demand equivalent was reduced from 268,000 to 7,000 p.p.m.

Example 4

A mixture of N,N-bis(methylphenyl)acetamide and dinitrobutylphenol was treated in a similar manner to Example 2. Color was reduced from 55,00 p.p.m. to 1,000 p.p.m. while oxygen demand equivalent was reduced from more than 220,000 p.p.m. to 1300 p.p.m. The pH of the original solution was 7.7 while that of the effluent was 5.0.

I claim:

1. A method for the pretreatment of a waste stream containing colored organic compounds selected from the group consisting of nitrophenols and nitroanilines prior to subjecting such stream to a disposal system which comprises:
   (A) adding an acid selected from the group consisting of sulfuric acid, hydrochloric acid, and phosphoric acid to a pH of less than about three;
   (B) adding an absorbent to take up colored components;
   (C) adding an alkaline material selected from the group consisting of calcium oxide, calcium hydroxide, magnesium oxide, and magnesium hydroxide to a pH of more than about five; and
   (D) separating the mixture into an effluent and a sludge.

2. A method as in claim 1 wherein the colored organic compound is 2,6 - dinitro - 4 - trifluoromethyl-N,N-dipropylaniline.

3. A method as in claim 2 wherein sufficient acid is added to give a pH of about 1, the adsorbent is a sludge, and the alkaline material is lime.

4. A method as in claim 1 wherein the colored organic compound is 2,6 - dinitro - 4 - methylsulfonyl-N,N-dipropylaniline.

5. A method as in claim 4 wherein sufficient acid is added to give a pH of about 1, the adsorbent is a sludge, and the alkaline material is lime.

6. A method for the disposal of a waste stream containing colored organic compounds selected from the group consisting of nitrophenols and nitroanilines which comprises:
   (A) adding an acid selected from the group consisting of sulfuric acid, phosphoric acid, and hydrochloric acid to a pH of less than about three;
   (B) adding an adsorbent to take up colored components;
   (C) adding an alkaline material selected from the group consisting of calcium oxide, calcium hydroxide, magnesium oxide, and magnesium hydroxide to a pH of more than about five;
   (D) separating the mixture into an effluent and a sludge;
   (E) subjecting said effluent to a biological treatment comprising at least one of aerobic oxidation, anaerobic reduction and anaerobic hydrolysis; and
   (F) subjecting said sludge to a treatment comprising long term lagooning for natural decomposition, centrifugation or filtration.

7. A method as in claim 6 wherein the colored organic compound is 2,6 - dinitro - 4 - trifluoromethyl - N,N-dipropylaniline.

8. A method as in claim 7 wherein sufficient acid is added to give a pH of about 1, the adsorbent is a sludge, and the alkaline material is lime.

9. A method as in claim 6 wherein the colored organic compound is 2,6 - dinitro - 4 - methylsulfonyl - N,N-dipropylaniline.

10. A method as in claim 9 wherein sufficient acid is added to give a pH of about 1, the adsorbent is a sludge, and the alkaline material is lime.

References Cited

Thorton, H. A., et al.: Adsorbents in Waste Water Treatment, Sewage and Industrial Wastes, vol. 23, April 1951, pp. 497–504.

Wilkinson, R.: Treatment and Disposal of Waste Water Containing Picric Acid and Dinitrophenol, Sewage and Industrial Wastes, 1951, pp. 1211–1212, vol. 23.

Besselievre, E. B.: Industrial Waste Treatment, First Ed., 1952, McGraw-Hill, New York, p. 194 relied on MICHAEL E. ROGERS, Primary Examiner U.S. Cl. X.R.

210—18, 24, 51, 61